US012804536B2

(12) United States Patent
Lv

(10) Patent No.: US 12,804,536 B2
(45) Date of Patent: Nov. 17, 2026

(54) MULTI-LAYER NETWORK COMMUNICATION SYSTEM AND METHOD, OPERATION CONTROL APPARATUS AND COMMUNICATION DEVICE

(71) Applicant: ZTE CORPORATION, Shenzhen (CN)

(72) Inventor: Xingzai Lv, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 221 days.

(21) Appl. No.: 18/838,150

(22) PCT Filed: Jan. 19, 2023

(86) PCT No.: PCT/CN2023/073246
§ 371 (c)(1),
(2) Date: Aug. 13, 2024

(87) PCT Pub. No.: WO2023/155660
PCT Pub. Date: Aug. 24, 2023

(65) Prior Publication Data

US 2025/0159602 A1 May 15, 2025

(30) Foreign Application Priority Data

Feb. 18, 2022 (CN) ........................ 202210153233.X

(51) Int. Cl.
*H04W 48/08* (2009.01)
*H04W 48/20* (2009.01)

(52) U.S. Cl.
CPC ........... *H04W 48/20* (2013.01); *H04W 48/08* (2013.01)

(58) Field of Classification Search
CPC ..... H04W 16/24; H04W 16/32; H04W 24/02; H04W 36/04; H04W 36/08; H04W 36/36; H04W 48/08; H04W 80/04; H04W 84/02
See application file for complete search history.

(56) References Cited

U.S. PATENT DOCUMENTS

2015/0373626 A1 12/2015 Yi et al.
2017/0223547 A1* 8/2017 Yu ........................ H04W 16/32
(Continued)

FOREIGN PATENT DOCUMENTS

CN 106604343 A 4/2017
CN 106961686 A 7/2017
(Continued)

OTHER PUBLICATIONS

CN 106604343 A, Machine Translation (Year: 2016).*
(Continued)

*Primary Examiner* — Khalid W Shaheed
(74) *Attorney, Agent, or Firm* — Vivacqua Crane, PLLC

(57) ABSTRACT

Disclosed are a multi-layer network communication system and method, an operation control apparatus, and a communication device. A multi-layer network constructed by the multi-layer network communication system includes an access layer and a service layer, the access layer includes at least one physical cell, the service layer comprises a flexible cell, and the flexible cell and the physical cell share an infrastructure and a spectrum, and use a same air interface protocol, the multi-layer network communication system includes a physical cell processor, a flexible cell manager, and a flexible cell processor.

18 Claims, 6 Drawing Sheets

(56) References Cited

U.S. PATENT DOCUMENTS

| | | | | |
|---|---|---|---|---|
| 2018/0006864 | A1* | 1/2018 | Hwang | H04L 5/0094 |
| 2019/0059109 | A1* | 2/2019 | Li | H04W 48/20 |
| 2020/0314712 | A1 | 10/2020 | Zhu et al. | |

FOREIGN PATENT DOCUMENTS

| | | | |
|---|---|---|---|
| CN | 110337786 | A | 10/2019 |
| CN | 112312378 | A | 2/2021 |
| WO | 2019205169 | A1 | 10/2019 |
| WO | 2021249235 | | 12/2021 |

OTHER PUBLICATIONS

International Searching Authority. International Search Report and Written Opinion for PCT Application No. PCT/CN2023/073246 and English translation, mailed May 12, 2023, pp. 1-14.

* cited by examiner

MULTI-LAYER NETWORK COMMUNICATION SYSTEM AND METHOD, OPERATION CONTROL APPARATUS AND COMMUNICATION DEVICE

CROSS-REFERENCE TO RELATED APPLICATION

This application is a national stage filing under 35 U.S.C. § 371 of international application number PCT/CN2023/073246, filed Jan. 19, 2023, which claims priority to Chinese patent application No. 202210153233.X filed Feb. 18, 2022. The contents of these applications are incorporated herein by reference in their entirety.

TECHNICAL FIELD

The present disclosure relates to the technical field of communication, and more particularly, to a multi-layer network communication system and method, an operation control apparatus, and a communication device.

BACKGROUND

Currently, communication systems typically center on the network to provide services for different mobile terminals in a certain area. Since access and service functions are provided by a single network layer, communication efficiency needs improvement. Due to the varying features and traffic of different mobile terminals, there is significant interference between communication signals, which affects communication quality.

SUMMARY

The present disclosure provides a multi-layer network communication system and method, an operation control apparatus, and a communication device.

In accordance with a first aspect of the present disclosure, an embodiment provides a multi-layer network communication system, where a multi-layer network constructed by the multi-layer network communication system includes an access layer and a service layer, the access layer includes at least one physical cell, the service layer includes a flexible cell, and the flexible cell and the physical cell share an infrastructure and a spectrum, and use the same air interface protocol; and the multi-layer network communication system includes a physical cell processor, a flexible cell manager, and a flexible cell processor, where the physical cell processor is configured for processing data of the physical cell, implementing mobility management of a mobile terminal in a non-access idle state, receiving an access request from the mobile terminal, enabling the mobile terminal to access the multi-layer network, and sending information of the mobile terminal to the flexible cell manager, the flexible cell manager is configured for creating the flexible cell processor according to the information of the mobile terminal, and allocating the mobile terminal to the flexible cell or the physical cell to receive a service, and the flexible cell processor is configured for creating the flexible cell, processing data of the flexible cell, and performing data sending/receiving communication with the mobile terminal.

In accordance with a second aspect of the present disclosure, an embodiment provides a multi-layer network communication method, performed by a flexible cell manager in a multi-layer network communication system, where a multi-layer network constructed by the multi-layer network communication system includes an access layer and a service layer, the access layer includes at least one physical cell, the service layer includes a flexible cell, and the flexible cell and the physical cell share an infrastructure and a spectrum, and use the same air interface protocol; and the multi-layer network communication system further includes a physical cell processor and a flexible cell processor, where the physical cell processor is configured for processing data of the physical cell, implementing mobility management of a mobile terminal in a non-access idle state, receiving an access request from the mobile terminal, enabling the mobile terminal to access the multi-layer network, and sending information of the mobile terminal to the flexible cell manager, the flexible cell manager is configured for creating the flexible cell processor, and the flexible cell processor is configured for creating the flexible cell, processing data of the flexible cell, and performing data sending/receiving communication with the mobile terminal, the method including: receiving information of the mobile terminal from a physical cell manager; and allocating, according to the information of the mobile terminal, the mobile terminal to the flexible cell or the physical cell to receive a service.

In accordance with a third aspect of the present disclosure, an embodiment provides an operation control apparatus, including at least one control processor and a memory communicatively connected to the at least one control processor, where the memory stores instructions executable by the at least one control processor which, when executed by the at least one control processor, cause the at least one control processor to implement the multi-layer network communication method according to the embodiment of the second aspect of the present disclosure.

In accordance with a fourth aspect of the present disclosure, an embodiment provides a communication device, including the operation control apparatus according to the embodiment of the third aspect of the present disclosure.

In accordance with a fifth aspect of the present disclosure, an embodiment provides a computer-readable storage medium, storing computer-executable instructions which, when executed by a computer, cause the computer to implement the multi-layer network communication method according to the embodiment of the second aspect of the present disclosure.

Additional features and advantages of the present disclosure will be set forth in the description which follows, and in part will be obvious from the description, or may be learned by the practice of the present disclosure. The objects and other advantages of the present disclosure can be realized and obtained by the structures particularly pointed out in the description, claims and drawings.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure, but are not intended to limit the technical schemes of the present disclosure.

The present disclosure is further described below in conjunction with the accompanying drawings and embodiments.

DETAILED DESCRIPTION

This section will give a detailed description of embodiments of the present disclosure. Some embodiments of the present disclosure are shown in the accompanying drawings. The function of the accompanying drawings is to use drawings to supplement the description of the text part of the description, such that those having ordinary skills in the art can intuitively and vividly understand each technical feature and the overall technical scheme of the present disclosure, but the accompanying drawings are not intended to be construed as limiting the scope of protection of the present disclosure.

In the description of the present disclosure, the term "at least one" means one or more, the term "plurality of" (or multiple) means at least two, the term such as "greater than", "less than", "exceed" or variants thereof prior to a number or series of numbers is understood to not include the number adjacent to the term. The term "at least" prior to a number or series of numbers is understood to include the number adjacent to the term "at least", and all subsequent numbers or integers that could logically be included, as clear from context.

In the description of the present disclosure, unless otherwise explicitly defined, the terms such as "configure", "install/mount" and "connect" should be understood in a broad sense, and those having ordinary skills in the art can reasonably determine the meanings of the above terms in the present disclosure based on the contents of the technical scheme.

Currently, communication systems center on the network and have a fixed service area. Existing cellular networks are of a single-layer structure at the wireless access end, and services are provided by a single network layer. As different mobile terminals have different traffic and different mobility features, there is high interference between communication signals, and the communication quality and communication efficiency need to be improved. Especially in high frequency bands, cells are fragmented, there is serious interference between communication signals in cellular cells, and the traffic load is heavy, leading to frequent cell handover. With the development of communication technologies, communication networks need to adapt to the trend of miniaturization and fragmented coverage of network cells in the future.

In view of the above, the embodiments of the present disclosure provide a multi-layer network communication system and method, an operation control apparatus, and a communication device, which can effectively suppress interference and improve communication efficiency.

The embodiments of the present disclosure will be further described in detail below in conjunction with the accompanying drawings.

Figure 1:
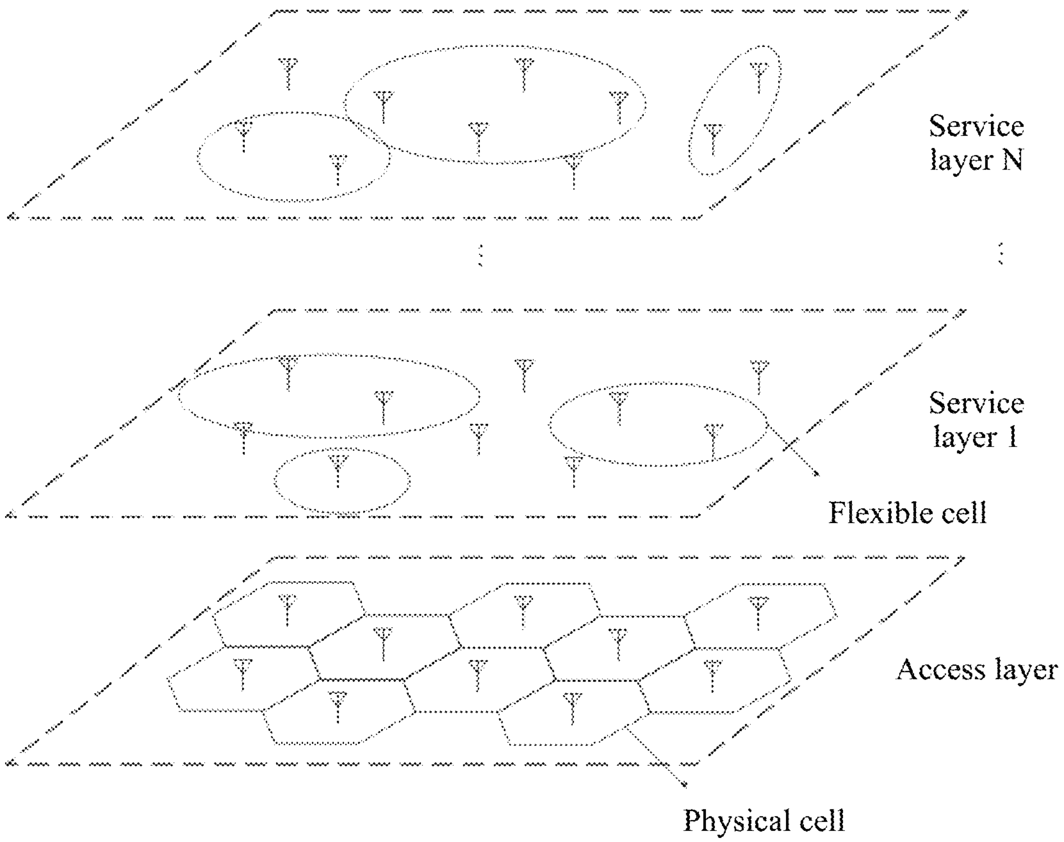
FIG. 1 is a schematic structural diagram of a multi-layer network according to an embodiment of the present disclosure.
Figure 2:
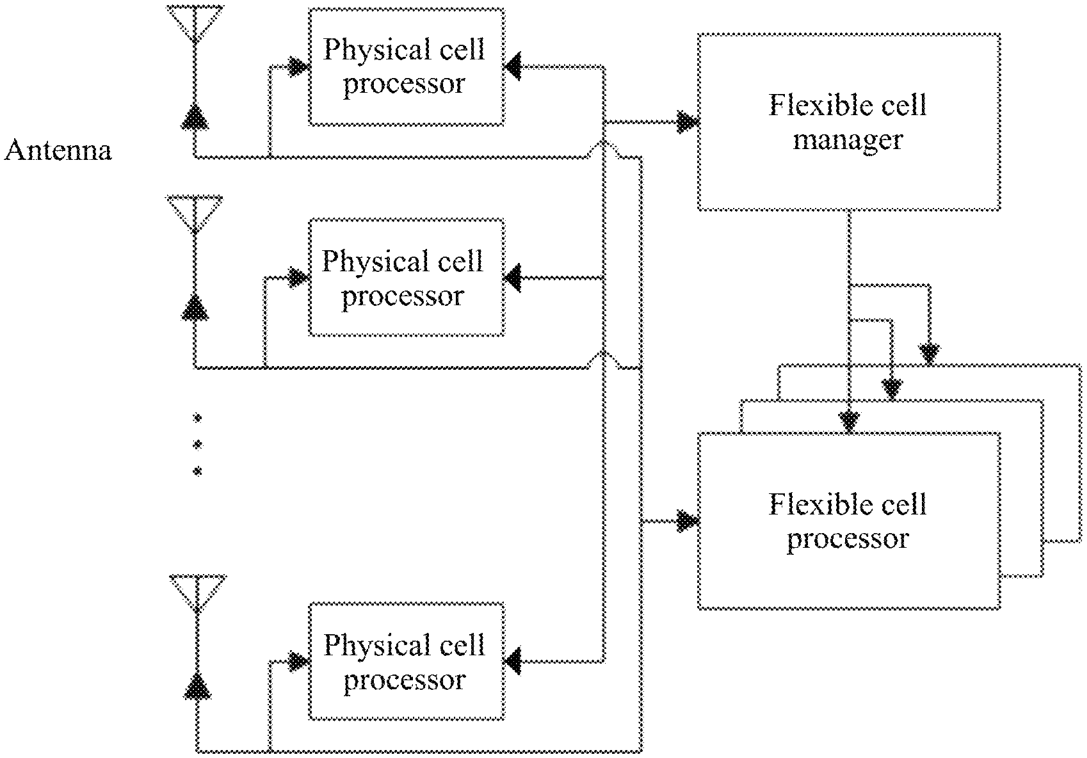
FIG. 2 is a schematic structural diagram of modules of a multi-layer network communication system according to an embodiment of the present disclosure.

Referring to FIG. 1 and FIG. 2. FIG. 1 is a schematic structural diagram of a multi-layer network in a multi-layer network communication system according to an embodiment of the present disclosure. The multi-layer network constructed by the system includes an access layer and at least one service layer. The access layer includes at least one physical cell. The service layer includes at least one flexible cell. Different mobile terminals can be allocated to different network layers according to features and traffic of the mobile terminals, thereby effectively suppressing interference and improving communication efficiency. The flexible cell and the physical cell share an infrastructure and a spectrum, and use the same air interface protocol. In this way, the facility issue and protocol issue involved in constructing a multi-layer network are solved, and there is no need to modify an existing protocol or mobile terminal or design a new air interface protocol and mobile terminal chip, thereby achieving high feasibility and strong backward compatibility. FIG. 2 is a schematic structural diagram of modules of a multi-layer network communication system according to an embodiment of the present disclosure. The embodiment of the present disclosure provides a multi-layer network communication system. Modules of the multi-layer network communication system include a physical cell processor, a flexible cell manager, and a flexible cell processor. The physical cell processor performs wireless communication with a mobile terminal through an existing infrastructure such as an antenna. The physical cell processor is configured for processing data of the physical cell, and implementing mobility management of a mobile terminal in a non-access idle state. In other words, the mobile terminal can camp on a suitable physical cell according to an existing idle state mobility protocol, such that the mobility problem of the mobile terminal in the non-access idle state is solved. The physical cell processor is further configured for receiving an access request from the mobile terminal, enabling the mobile terminal to access the multi-layer network, and sending information of the mobile terminal to the flexible cell manager, such that the flexible cell manager can create the flexible cell processor according to the information of the mobile terminal, and allocate the mobile terminal to the flexible cell or the physical cell to receive a service. The flexible cell processor is configured for creating the flexible cell, processing data of the flexible cell, and performing data sending/receiving communication with the mobile terminal. Different combinations of infrastructure and resources can be used to provide network coverage for different mobile terminals, so that the utilization efficiency of the combinations of infrastructure and resources, user experience, and performance are improved, and the unbinding of services and resources is achieved.

It should be noted that the flexible cell manager creates the flexible cell processor according to the information of the mobile terminal, such that the flexible cell processor creates the flexible cell, and allocates the mobile terminal to the flexible cell.

It can be understood that the service layer including at least one flexible cell means that for one mobile terminal, one service layer may include one flexible cell, or may include a plurality of flexible cells of the same type, and flexible cells of different service layers are not of the same type.

It can be understood that the service layer further includes a physical cell, i.e., the physical cell can not only constitute the access layer, but also provide services for mobile terminals. In other words, the flexible cell manager may camp a mobile terminal on or allocate a mobile terminal to a physical cell, such that the mobile terminal receives a service in the physical cell.

It should also be noted that the physical cell may be an existing cellular cell.

It should also be noted that the physical cell processor may be a data processing communication module in an existing base station, and the flexible cell manager and the flexible cell processor may be deployed on an edge computing node or a cloud server. The deployment mode of the physical cell processor, the flexible cell manager, and the flexible cell processor are not particularly limited in this embodiment, as long as the modules can realize corresponding functions.

It should also be noted that the information of the mobile terminal may be a moving speed of the mobile terminal or a signal to interference plus noise ratio of the mobile terminal, i.e., a ratio of signal power to the sum of interference and noise power. The type of the information of the mobile terminal is not particularly limited in this embodiment, as long as the flexible cell manager can allocate a corresponding cell to the mobile terminal according to the information of the mobile terminal.

In an embodiment, the flexible cell may be formed by the physical cell accessed by the mobile terminal and at least one antenna facility of a neighboring cell of the physical cell. As the flexible cell shares the infrastructure with the physical cell, there is no need to deploy a new device, thereby reducing costs and achieving high feasibility.

It can be understood that at least one antenna facility of a neighboring cell with highest signal strength of the physical cell may be selected to form the flexible cell, or at least one antenna facility with highest interference may be selected to form the flexible cell. All antennas in the flexible cell send the same signal, thereby effectively suppressing interference and improving communication quality.

It can be understood by those having ordinary skills in the art that the flexible cell processor creates a flexible cell and selects an antenna facility to participate in the construction of the flexible cell, i.e., the flexible cell created by the flexible cell processor is connected to an antenna node provided by the antenna facility.

It should be noted that the number of antenna facilities in the neighboring cell of the physical cell that constitute the flexible cell is not particularly limited in this embodiment, and the number of antenna facilities in the neighboring cell of the physical cell may be four, five, or six, as long as the antenna facilities can constitute the flexible cell.

It should also be noted that the flexible cell can share the spectrum with the physical cell, and respective physical channels of the flexible cell and the physical cell may be used in combination through time division or frequency division, static multiplexing, or real-time scheduling dynamic multiplexing without interference with each other, thereby reducing frequency band occupation.

In an embodiment, the flexible cell processor can dynamically change the antenna node connected to the flexible cell according to the information of the mobile terminal. The flexible cell manager creates the flexible cell processor according to the information of the mobile terminal, and the flexible cell processor can determine the antenna node connected to the flexible cell according to the information of the mobile terminal, so as to determine a coverage range of the flexible cell. The flexible cell processor processes the data of the flexible cell, and can dynamically change the antenna node connected to the flexible cell according to the information of the mobile terminal, such that the flexible cell can follow the mobile terminal to move. In this way, the multi-layer network in the multi-layer network communication system can center on the mobile terminal, and has the advantages of effective interference suppression and a reduced number of times of handover over existing communication systems that center on the network, can solve the problems of serious mutual interference, frequent handover, and heavy traffic load caused by fragmented cells to a certain extent, and is more suitable for the trend of miniaturization and fragmented coverage of network cells in the future.

For example, if the flexible cell is formed by a combination of the physical cell where the mobile terminal is currently located and three antenna facilities of the neighboring cell of the physical cell. The three antenna facilities are the three antenna facilities with the highest signal strength in vicinity of the mobile terminal. As the mobile terminal moves, the flexible cell processor selects three new antenna facilities according to signal strength of antenna facilities nearby, i.e., dynamically changes the antenna node connected to the flexible cell. This ensures that the mobile terminal can receive the service stably in the flexible cell, and reduce the number of times of handover.

Figure 3:
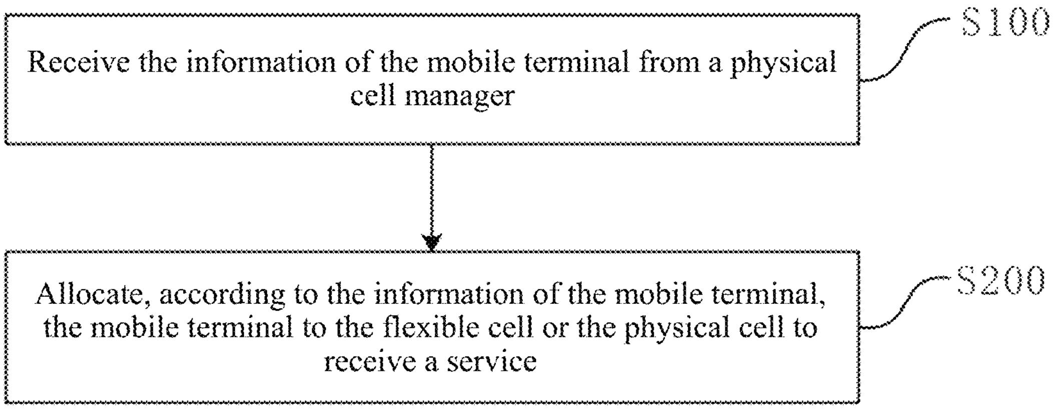
FIG. 3 is a flowchart of steps of a multi-layer network communication method according to an embodiment of the present disclosure.

Referring to FIG. 3, an embodiment of the present disclosure provides a multi-layer network communication method. FIG. 3 is a flowchart of steps of a multi-layer network communication method according to an embodiment of the present disclosure. The method is performed by the flexible cell manager in the multi-layer network communication system provided in the above embodiment of the present disclosure. Modules of the multi-layer network communication system include a physical cell processor, a flexible cell manager, and a flexible cell processor. The physical cell processor is configured for processing data of the physical cell, implementing mobility management of a mobile terminal in a non-access idle state, receiving an access request from the mobile terminal, enabling the mobile terminal to access the multi-layer network, and sending information of the mobile terminal to the flexible cell manager. According to the information of the mobile terminal, the flexible cell manager can allocate the mobile terminal to the flexible cell or the physical cell to receive a service. The flexible cell processor is configured for creating the flexible cell, processing data of the flexible cell, and performing data sending/receiving communication with the mobile terminal. The method includes, but not limited to, the following steps S100 and S200.

At S100, the information of the mobile terminal is received from a physical cell manager.

At S200, according to the information of the mobile terminal, the mobile terminal is allocated to the flexible cell or the physical cell to receive a service.

In an embodiment, the physical cell processor receives an access request initiated by the mobile terminal, connects the mobile terminal to the access layer of the multi-layer network, and sends the information of the mobile terminal to the flexible cell manager, and the flexible cell manager allocates, according to the information of the mobile terminal, the mobile terminal to the flexible cell or the physical cell to receive a service. In this way, mobile terminals having different features and different traffic are allocated to different network layers, to effectively suppress interference and improve communication efficiency. In addition, different combinations of infrastructure and resources are used to provide network coverage for different mobile terminals, so that the utilization efficiency of the combinations of infrastructure and resource, user experience, and performance are improved, and the unbinding of services and resources is achieved. The flexible cell and the physical cell share an infrastructure and a spectrum, and there is no need to modify an existing protocol or mobile terminal or design a new air interface protocol and mobile terminal chip, thereby achieving high feasibility and strong backward compatibility of the method.

It should be noted that in the multi-layer network communication system to which the method provided in this embodiment is performed, mobility management of mobile terminals in the non-access idle state may be implemented by the physical cell processor. In some embodiments, according to an existing idle-mode mobility protocol, the mobile terminal can camp on an appropriate physical cell for location update, broadcast, and paging message receiving and sending. The embodiment provided by the present disclosure can solve the problem of mobility management of mobile terminals in the non-access idle state in the multi-layer network, and there is no need to design a new communication protocol and mobile terminal chip, thereby ensuring the feasibility of the method.

In an embodiment, the flexible cell manager receives the information of the mobile terminal, and creates a corresponding flexible cell processor according to the information of the mobile terminal, such that the flexible cell processor creates a corresponding flexible cell according to the information of the mobile terminal. The flexible cell processor can determine a coverage range of the flexible cell, and determine the antenna node connected to the flexible cell according to the information of the mobile terminal, such that the physical cell where the mobile terminal is currently located and at least one antenna facility of the neighboring cell of the physical cell form a flexible cell.

It should be noted that the flexible cell processor can dynamically change the antenna node connected to the flexible cell according to the change of the information of the mobile terminal, such that the flexible cell can move with the mobile terminal, to ensure the communication quality of the mobile terminal and reduce the number of times of cell handover due to the change of the location of the mobile terminal. In other words, the multi-layer network provided in the embodiment of the present disclosure can center on the mobile terminal. For one mobile terminal, the service layer is formed by one flexible cell. The flexible cell can dynamically change the antenna node connected to the flexible cell, and move with the location of the mobile terminal, to ensure that the mobile terminal can keep receiving a particular service in the flexible cell during movement, thereby ensuring the communication quality and reducing the number of times of handover.

Figure 4:
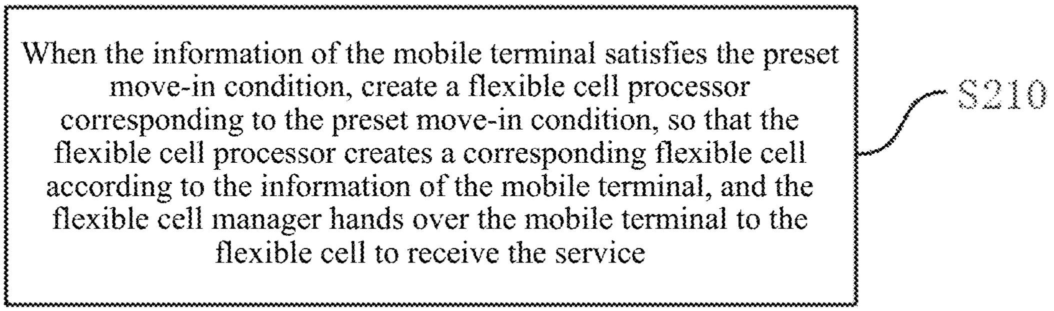
FIG. 4 is a detailed flowchart of step S200 in a multi-layer network communication method according to an embodiment of the present disclosure.

Referring to FIG. 4, an embodiment of the present disclosure provides a multi-layer network communication method. FIG. 4 is a detailed flowchart of step S200 in a multi-layer network communication method according to an embodiment of the present disclosure. The method is performed by the flexible cell manager in the multi-layer network communication system provided in the above embodiment. The multi-layer network in the multi-layer network communication system includes at least one service layer. The flexible cell is preset in the service layer, and a corresponding preset move-in condition is set for each type of flexible cell. As shown in FIG. 4, S200 in FIG. 3 includes, but not limited to, a following step S210.

At S210, when the information of the mobile terminal satisfies the preset move-in condition, a flexible cell processor corresponding to the preset move-in condition is created, such that the flexible cell processor creates a corresponding flexible cell according to the information of the mobile terminal, and the flexible cell manager hands over the mobile terminal to the flexible cell to receive the service.

In an embodiment, the multi-layer network includes at least one service layer, and the service layer includes at least one flexible cell. A corresponding preset move-in condition is set for the flexible cell in each service layer, i.e., each service layer has a corresponding preset move-in condition. Each type of flexible cell is created by the corresponding flexible cell processor. Therefore, the preset move-in conditions are also in one-to-one correspondence with the flexible cell processors. The flexible cell manager may allocate mobile terminals to different network layers, i.e., different flexible cells or physical cells, according to the information of the mobile terminals and the preset move-in conditions. When determining that the information of the mobile terminal satisfies a certain type of preset move-in condition, the flexible cell manager creates a flexible cell processor corresponding to the preset move-in condition. The flexible cell processor creates a corresponding flexible cell according to the information of the mobile terminal. The flexible cell manager allocates the mobile terminal to the flexible cell, such that the mobile terminal receives a service from a network layer that is set for behavior, traffic, and other information of the mobile terminal, thereby effectively suppressing interference and improving communication efficiency.

It can be understood that for one mobile terminal, one service layer may include one flexible cell, or may include a plurality of flexible cells of the same type; while for a plurality of mobile terminals, one service layer in the multi-layer network communication system may include a plurality of flexible cells corresponding to the plurality of mobile terminals, and the flexible cells of the same service layer are of the same type, and correspond to the same preset move-in condition. Different service layers include different types of flexible cells, and correspond to different preset move-in conditions.

It should be noted that the service layer may further include a physical cell.

Figure 5:
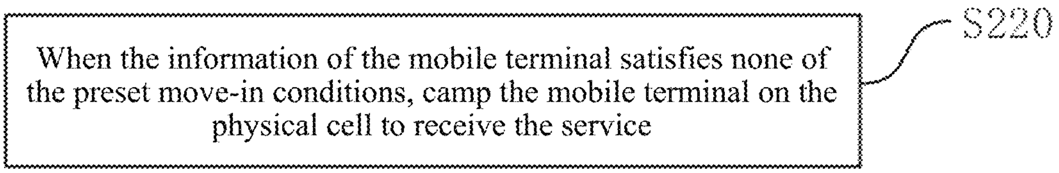
FIG. 5 is a detailed flowchart of step S200 in a multi-layer network communication method according to an embodiment of the present disclosure.

FIG. 5 is a detailed flowchart of step S200 in a multi-layer network communication method according to an embodiment of the present disclosure. S200 in FIG. 3 further includes, but not limited to, a following step S220.

At S220, when the information of the mobile terminal satisfies none of the preset move-in conditions, the mobile terminal is camped on the physical cell to receive the service.

In this embodiment, when the information of the mobile terminal satisfies none of the preset move-in conditions, the flexible cell manager camps the mobile terminal on the physical cell to receive the service. In other words, there is no need to create a flexible cell, and the physical cell can provide the mobile terminal with a stable and efficient communication service or a better communication service, thereby saving network resources.

Figure 6:
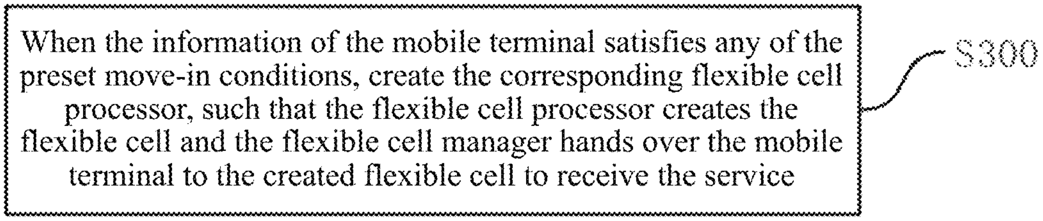
FIG. 6 is a flowchart of a part of steps of a multi-layer network communication method according to another embodiment of the present disclosure.

Referring to FIG. 6, an embodiment of the present disclosure provides a multi-layer network communication method. FIG. 6 is a flowchart of a part of steps of a multi-layer network communication method according to an embodiment of the present disclosure. The method is performed by the flexible cell manager in the multi-layer network communication system provided in the above embodiment. In the multi-layer network communication system, when the mobile terminal receives the service from the physical cell, the method further includes a following step S300.

At S300, when the information of the mobile terminal satisfies any of the preset move-in conditions, the corresponding flexible cell processor is created, such that the flexible cell processor creates the flexible cell and the flexible cell manager hands over the mobile terminal to the created flexible cell to receive the service.

In an embodiment, after the mobile terminal accesses the multi-layer network, the flexible cell manager allocates the mobile terminal to a physical cell according to the information of the mobile terminal; and when the mobile terminal receives a service from the physical cell and the information of the mobile terminal satisfies any one of the preset move-in conditions, the flexible cell manager creates a corresponding flexible cell processor according to the information of the mobile terminal and the preset move-in condition, such that the flexible cell processor creates a flexible cell, and the flexible cell manager hands over the mobile terminal to the flexible cell to receive the service.

It can be understood that in the multi-layer network communication system provided by the present disclosure, the flexible cell manager may hand over the mobile terminal to an appropriate cell according to the information of the mobile terminal, such that the mobile terminal can receive services from different network layers according to different behaviors and traffic of the mobile terminal, thereby effectively suppressing interference and improving communication efficiency.

Figure 7:
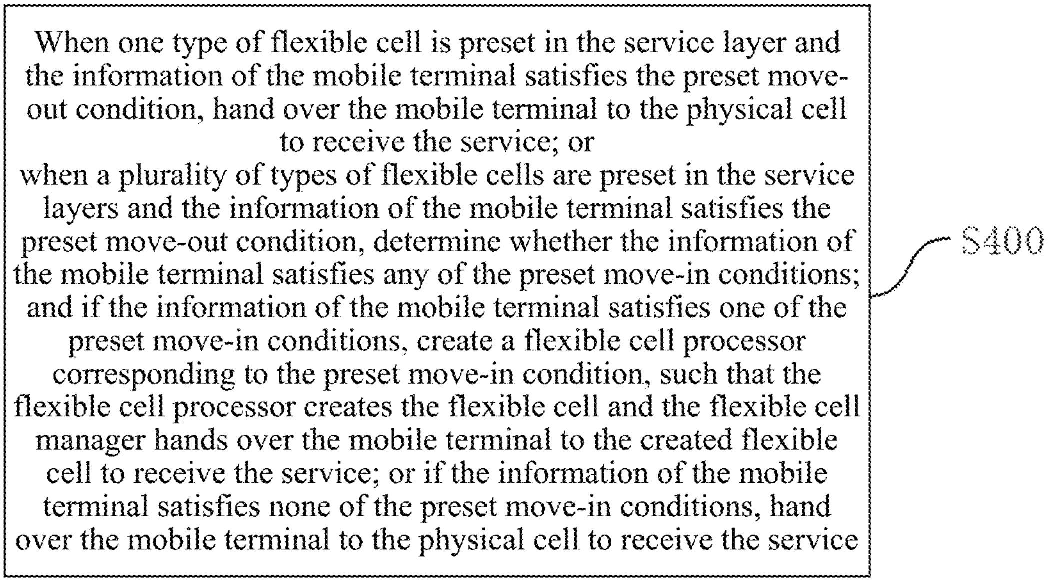
FIG. 7 is a flowchart of a part of steps of a multi-layer network communication method according to still another embodiment of the present disclosure.

Referring to FIG. 7, an embodiment of the present disclosure further provides a multi-layer network communication method. FIG. 7 is a flowchart of a part of steps of a multi-layer network communication method according to an embodiment of the present disclosure. The method is performed by the flexible cell manager in the multi-layer network communication system provided in the above embodiment. In the multi-layer network communication system, a corresponding preset move-out condition is set for each type of flexible cell, and when the mobile terminal receives the service from the flexible cell, the method further includes a following step S400.

At S400, when one type of flexible cell is preset in the service layer and the information of the mobile terminal satisfies the preset move-out condition, the mobile terminal is handed over to the physical cell to receive the service; or when a plurality of types of flexible cells are preset in the service layers and the information of the mobile terminal satisfies the preset move-out condition, it is determined whether the information of the mobile terminal satisfies any of the preset move-in conditions; and if the information of the mobile terminal satisfies one of the preset move-in conditions, a flexible cell processor corresponding to the preset move-in condition is created, such that the flexible cell processor creates the flexible cell and the flexible cell manager hands over the mobile terminal to the created flexible cell to receive the service; or if the information of the mobile terminal satisfies none of the preset move-in conditions, the mobile terminal is handed over to the physical cell to receive the service.

In an embodiment, the flexible cell manager allocates the mobile terminal to a corresponding flexible cell according to features, and traffic, and other information of the mobile terminal according to the preset move-in condition. When the mobile terminal receives a service from the flexible cell and the information of the mobile terminal satisfies the preset move-out condition, the flexible cell manager hands over the mobile terminal from the flexible cell to another cell, such that the mobile terminal receives the service from a more appropriate cell, thereby ensuring communication quality and communication efficiency.

It should be noted that one type of flexible cell being preset in the service layer means that there are only two network layers in the multi-layer network, and a plurality of types of flexible cells being preset in the service layers means that the multi-layer network includes a plurality of network layers in addition to the access layer.

In an embodiment, one type of flexible cell is preset in the service layer, i.e., there are only two layers in the multi-layer network. When the information of the mobile terminal satisfies the preset move-out condition, the flexible cell manager hands over the mobile terminal from the current flexible cell to a physical cell to receive the service, such that the communication quality and communication efficiency can be ensured while saving network resources.

In another embodiment, a plurality of types of flexible cells are preset in the service layers, i.e., the multi-layer network includes a plurality of network layers in addition to the access layer. When the information of the mobile terminal satisfies the preset move-out condition, the flexible cell manager determines whether the information of the mobile terminal satisfies any one of the preset move-in conditions. If the information of the mobile terminal satisfies one of the preset move-in conditions, the flexible cell manager creates a flexible cell processor corresponding to the preset move-in condition, such that the flexible cell processor creates a flexible cell, and the flexible cell manager hands over the mobile terminal from the current flexible cell to the newly created flexible cell to receive the service. In this way, the mobile terminal can receive the service from a more appropriate flexible cell, thereby ensuring communication quality and communication efficiency. If the information of the mobile terminal satisfies none of the preset move-in conditions, the mobile terminal is handed over to a physical cell to receive the service, such that the communication quality and communication efficiency can be ensured while saving network resources.

In an embodiment, the flexible cell manager hands over the mobile terminal from the flexible cell to another cell according to the preset move-out condition and the preset move-in condition; and after the mobile terminal is moved out of the flexible cell, the flexible cell manager deletes the flexible cell processor corresponding to the flexible cell, i.e., the flexible cell is deleted.

It can be understood that in the multi-layer network communication method provided in this embodiment, a flexible cell can be created instantly and deleted dynamically. Deletion of unwanted flexible cells can reduce the occupation of network resources to improve network utilization.

In some embodiments of the present disclosure, the multi-layer network communication method provided by the present disclosure further includes: after creating the flexible cell, configuring the physical cell accessed by the mobile terminal and a neighboring cell of the physical cell as neighboring cells of the flexible cell.

In an embodiment, because the flexible cell and the physical cell share an air interface protocol, the physical cell accessed by the mobile terminal and the neighboring cell of the physical cell may be configured as neighboring cells of the flexible cell. By configuring neighboring cells for the flexible cell, an existing air interface protocol is applicable to the flexible cell, and the mobile terminal can measure various measurement parameters of communication signals according to an existing protocol, thereby ensuring the feasibility of the multi-layer network communication method.

In some embodiments of the present disclosure, the mode of handing over the mobile terminal between flexible cell and another cell is a virtual handover, i.e., the handover of the mobile terminal between the flexible cell and another cell is implemented by sending signaling used to change a serial number of a cell on an air interface. In some embodiments, when the mobile terminal requires cell handover, the flexible cell manager sends signaling to start the virtual handover, such that the current cell sends handover signaling, to change the serial number of the cell on the air interface to a serial number of a target cell, so as to realize the virtual handover. The target cell is a cell that the mobile terminal needs to be handed over to.

It can be understood that the actual physical node is not changed during the handover process, and the number of times of physical node switching is reduced, thereby improving the communication efficiency. In addition, the mobile terminal does not distinguish between the physical cells and the flexible cells, and therefore no additional hardware or software needs to be designed, to ensure the feasibility of the multi-layer network communication method.

The multi-layer network communication method provided by the present disclosure will be described below in conjunction with the accompanying drawings.

Figure 8:
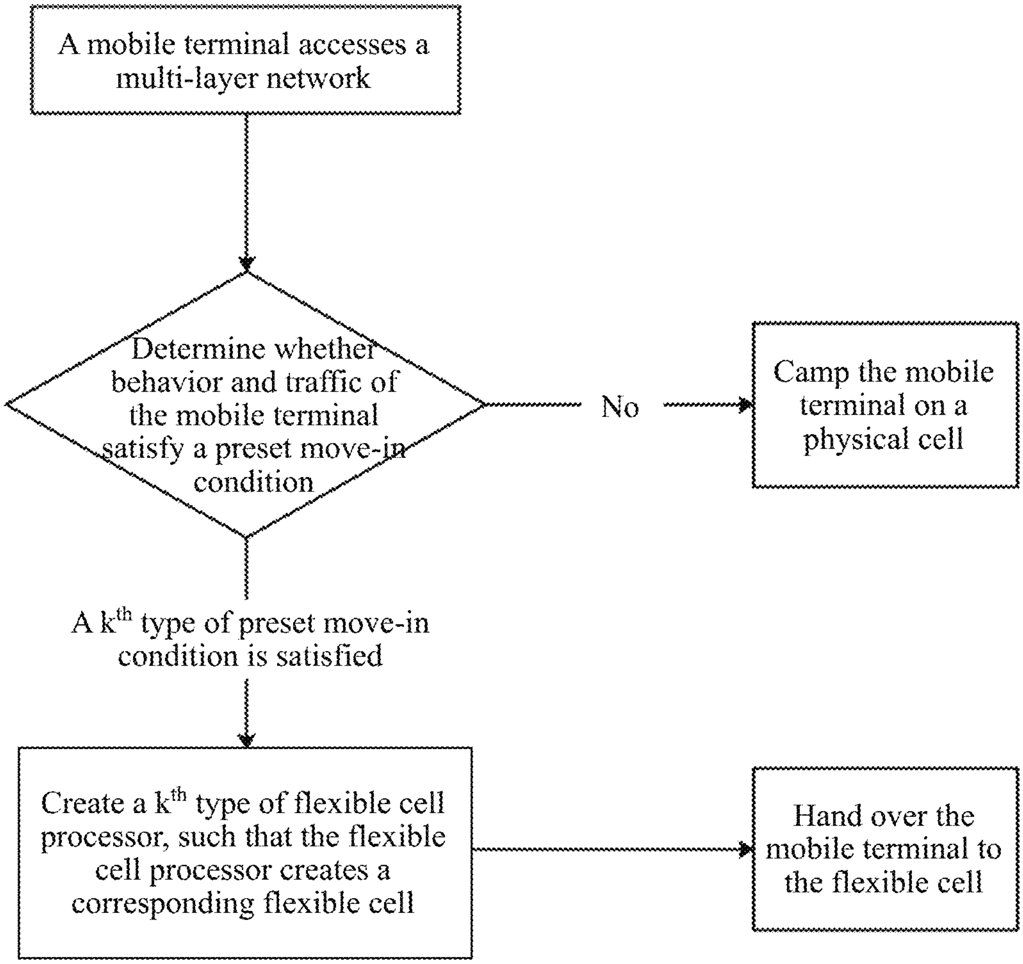
FIG. 8 is a partial flowchart of a network service according to an embodiment of the present disclosure.

FIG. 8 is a schematic diagram of a service process of a flexible cell manager for a newly accessing mobile terminal according to an embodiment of the present disclosure. In some embodiments, a mobile terminal accesses a physical cell, a physical cell manager sends information of the mobile terminal to a flexible cell manager, and the flexible cell manager determines whether the information of the mobile terminal satisfies a preset move-in condition. The information of the mobile terminal is behavior and traffic of the mobile terminal, and a preset move-in condition is set for each type of flexible cell, and is defined as $C_i$, i=1, . . . , N. It can be understood that the N types of preset move-in conditions are different from each other. If the behavior and traffic of the mobile terminal satisfy a kth type of preset move-in condition $C_k$, the flexible cell manager creates a kth type of flexible cell processor, such that the flexible cell processor creates a corresponding flexible cell, and the flexible cell manager virtually hands over the mobile terminal from the physical cell to the kth type of flexible cell. If the behavior and traffic of the mobile terminal satisfy none of the preset move-in conditions, the flexible cell manager camps the mobile terminal on the physical cell.

Figure 9:
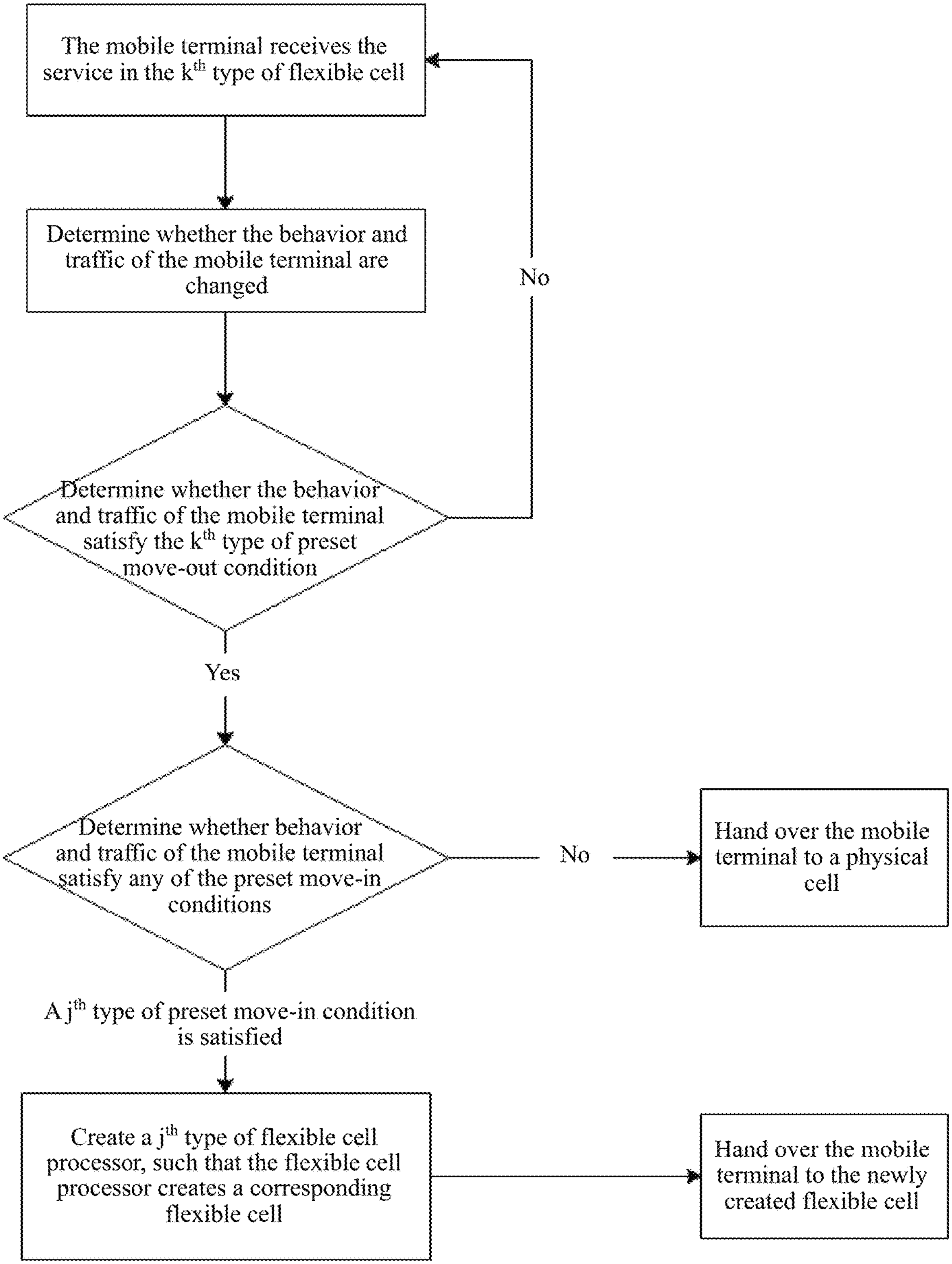
FIG. 9 is a partial flowchart of a network service according to another embodiment of the present disclosure.

FIG. 9 is a schematic diagram of a service process of a flexible cell manager for a mobile terminal after information of the mobile terminal is changed according to an embodiment of the present disclosure. In some embodiments, the mobile terminal receives the service in the kth type of flexible cell according to behavior and traffic of the mobile terminal and the preset move-in condition. When the behavior and traffic of the mobile terminal are changed, the physical cell manager determines whether the behavior and traffic of the mobile terminal satisfy a preset move-out condition corresponding to the kth flexible cell $E_k$. It should be noted that a preset move-out condition is preset for each type of flexible cell, and is defined as $E_i$, where i=1, . . . , N. If the behavior and traffic of the mobile terminal do not satisfy the preset move-out condition $E_k$, the flexible cell manager camps the mobile terminal on the current kth type of flexible cell. If the behavior and traffic of the mobile terminal satisfy the preset move-out condition $E_k$, the flexible cell manager determines whether the behavior and traffic of the mobile terminal satisfy the preset move-in conditions $C_i$. If the behavior and traffic of the mobile terminal satisfy a preset move-in condition $C_j$ corresponding to a jth type of flexible cell, the flexible cell manager creates a jth type of flexible cell processor, such that the flexible cell processor creates a jth type of flexible cell, and the flexible cell manager virtually hands over the mobile terminal from the kth type of flexible cell to the jth type of flexible cell. If the behavior and traffic of the mobile terminal satisfy none of the preset move-in conditions, the flexible cell manager hands over the mobile terminal from the kth type of flexible cell to a physical cell.

In an embodiment, in a 5G cellular network with a frequency of 3.5 GHZ and a bandwidth of 100 MHz, a conventional 5G cell is set as the physical cell, and a data processing communication module in an existing 5G base station is used as the physical cell processor, the flexible cell processor and the flexible cell manager are deployed on an edge computing node or a cloud server, and the mobile terminal is a device such as a mobile phone or data card that complies with 5G protocols. It is assumed that there is only one type of flexible cell in the network, and the preset move-in condition $C_1$ corresponding to this type of flexible cell is "the moving speed of the mobile terminal exceeds 60 kilometers per hour", and a preset move-out condition $E_1$ corresponding to this type of flexible cell is "the moving speed of the mobile terminal is less than 30 kilometers per hour." A service process of the multi-layer network is as follows. When the mobile terminal is in a non-access idle state, the mobile terminal camps on an appropriate physical cell for location update, broadcast, and paging message receiving and sending according to a 5G idle-mode mobility protocol. When traffic arrives, the mobile terminal initiates an access, and according to a 5G air interface protocol, performs cell access under the current physical cell that the mobile terminal camps on, and enters a connected mode. The physical cell processor measures the moving speed of the mobile terminal and sends same to the flexible cell manager. The moving speed may be measured based on measurement of a Doppler frequency shift of a communication signal. The flexible cell manager determines whether the moving speed of the mobile terminal exceeds 60 kilometers per hour, and if yes, determines that the mobile terminal should be served by a flexible cell, creates a new flexible cell processor, and allocates the mobile terminal to the flexible cell processor to receive the service. The flexible cell processor combines the currently serving physical cell and antenna facilities of six neighboring cells with highest signal strength of the currently serving physical cell to form a flexible cell. Signals sent by all antennas in the flexible cell are the same. The flexible cell and the physical cell share the 100 MHz bandwidth, and respective physical channels of the flexible cell and the physical cell are used in combination through time division or frequency division, static multiplexing, or real-time scheduling dynamic multiplexing without interference with each other. The flexible cell manager sends signaling to initiate a virtual handover process between the corresponding physical cell and the flexible cell. The physical cell sends a handover command and determines the flexible cell as a target cell. After receiving the handover command, the mobile terminal disconnects a link to the current physical cell according to a 5G protocol, performs resynchronization, and accesses the flexible cell. The actual communication node remains unchanged during the virtual handover. After the virtual handover succeeds, the physical cell accessed by the mobile terminal and the neighboring cells of the physical cell are configured as neighboring cells of the flexible cell, and the mobile terminal can measure measurement parameters of the communication signal according to the configured neighboring cells. The mobile terminal receives the service from the flexible cell. When the mobile terminal moves to an edge of the current flexible cell, the flexible cell processor re-combines antenna facilities of six neighboring cells with highest signal strength to form the current flexible cell, to ensure that the flexible cell moves together with the mobile terminal, and the mobile terminal does not need to be handed over to another flexible cell during movement.

In another embodiment, in a 4G cellular network with a frequency of 2.6 GHz and a bandwidth of 20 MHZ, a conventional 4G cell is set as the physical cell, and a data processing communication module in an existing 4G base station is used as the physical cell processor. The flexible cell processor and the flexible cell manager are deployed on an edge computing node or a cloud server. The mobile terminal is a device such as a mobile phone or data card that complies with 4G protocols. It is assumed that there is only one type of flexible cell in the multi-layer network, and the preset move-in condition $C_1$ corresponding to this type of flexible cell is "the current SINR of the mobile terminal is lower than 5 dB", and a preset move-out condition $E_1$ corresponding to this type of flexible cell is "the current SINR of the mobile terminal is higher than 10 dB." A process of the multi-layer network is as follows. When the mobile terminal is in a non-access idle state, the mobile terminal camps on an appropriate physical cell for location update, broadcast, and paging message receiving and sending according to a 4G idle-mode mobility protocol. When traffic arrives, the mobile terminal initiates an access, and according to an 4G air interface protocol, performs cell access under the current physical cell that the mobile terminal camps on, and enters a connected mode. The physical cell processor measures received signal strength of the mobile terminal and interference received by the mobile terminal and sends same to the flexible cell manager. The received signal strength and interference may be measured based on measurement and reporting of pilot information of a communication signal. The flexible cell manager determines whether the current SINR of the mobile terminal is lower than 5 dB, and if yes, determines that the mobile terminal should be served by a flexible cell, creates a new flexible cell processor, and allocates the mobile terminal to the flexible cell processor to receive the service. The flexible cell processor combines the currently serving physical cell and antenna facilities of three neighboring cells with highest interference strength of the currently serving physical cell to form a flexible cell. Signals sent by all antennas in the flexible cell are the same. The flexible cell and the physical cell share the 20 MHz bandwidth, and respective physical channels of the flexible cell and the physical cell are used in combination through time division or frequency division, static multiplexing, or real-time scheduling dynamic multiplexing without interference with each other. The flexible cell manager sends signaling to initiate a virtual handover process between the corresponding physical cell and the flexible cell. The physical cell sends a handover command and determines the flexible cell as a target cell. After receiving the handover command, the mobile terminal disconnects a link to the current physical cell according to a 4G protocol, performs resynchronization, and accesses the flexible cell. The actual communication node remains unchanged during the virtual handover. After the virtual handover succeeds, the physical cell accessed by the mobile terminal and the neighboring cells of the physical cell are configured as neighboring cells of the flexible cell, and the mobile terminal can measure measurement parameters of the communication signal according to the configured neighboring cells. The mobile terminal receives the service from the flexible cell. When the current signal environment of the mobile terminal changes, and the SINR of the mobile terminal when not served by the flexible cell can be higher than 10 dB, the flexible cell manager determines that the current mobile terminal no longer needs to be served by the flexible cell, and sends signaling to initiate a virtual handover between the flexible cell and the physical cell. The flexible cell sends a handover command and determines the physical cell as a target cell. After receiving the handover command, the mobile terminal disconnects a link to the current flexible cell according to a 4G protocol, performs resynchronization, and accesses the physical cell. The actual communication node remains unchanged during the virtual handover.

Figure 10:
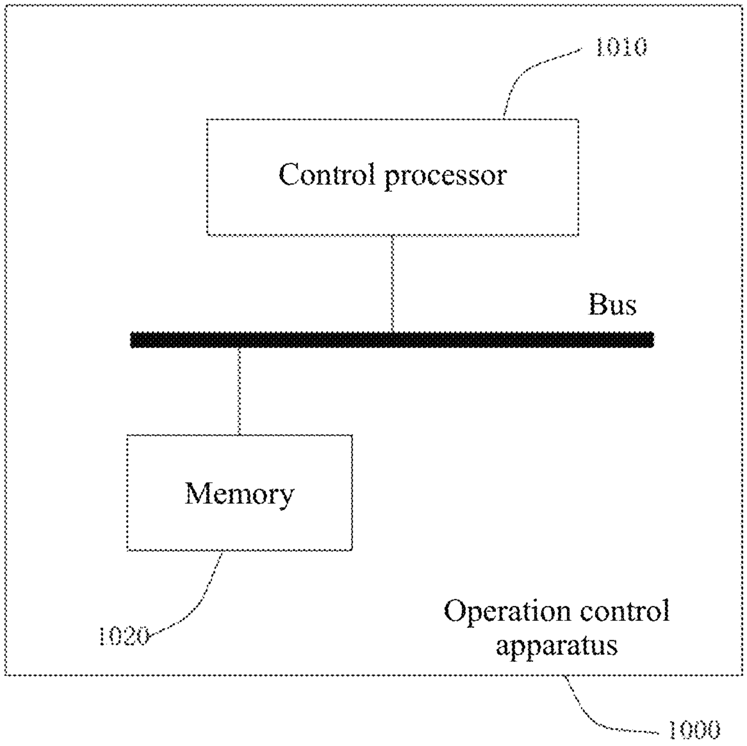
FIG. 10 is a schematic structural diagram of an operation control apparatus according to an embodiment of the present disclosure.

Referring to FIG. 10, an embodiment of the present disclosure provides an operation control apparatus 1000. The apparatus includes at least one control processor 1010 and a memory 1020 communicatively connected to the at least one control processor 1010. The memory 1020 stores instructions executable by the at least one control processor 1010 which, when executed by the at least one control processor 1010, cause the at least one control processor 1010 to implement the multi-layer network communication method in any one of the above embodiments.

It can be understood that the operation control device 1000 can execute the multi-layer network communication method in any one of the above embodiments, and can construct a multi-layer network communication system based on an existing infrastructure and air interface protocol. Network layers of a multi-layer network constructed by the multi-layer network communication system includes an access layer and at least one service layer. The access layer includes at least one physical cell. Each service layer includes at least one flexible cell. The flexible cell and the physical cell share an infrastructure and a spectrum, and use the same air interface protocol. The physical cell is configured for implementing mobility management of a mobile terminal in a non-access idle state. The multi-layer network includes a plurality of network layers for different functions and purposes. Different mobile terminals can be allocated to corresponding network layers according to traffic of the mobile terminals, thereby effectively suppressing interference and improving communication efficiency. In addition, different combinations of infrastructure and resources are used to provide network coverage for different mobile terminals, so that the utilization efficiency of the combinations of infrastructure and resource, user experience, and performance are improved, and the unbinding of services and resources is achieved.

An embodiment of the present disclosure provides a communication device. The device includes the operation control device 1000 provided in the above embodiment, and construct a multi-layer network communication system based on an existing infrastructure and air interface protocol.

Network layers of a multi-layer network constructed by the multi-layer network communication system includes an access layer and at least one service layer. The access layer includes at least one physical cell. Each service layer includes at least one flexible cell. The flexible cell and the physical cell share an infrastructure and a spectrum, and use the same air interface protocol. The physical cell is configured for implementing mobility management of a mobile terminal in a non-access idle state. The multi-layer network includes a plurality of network layers for different functions and purposes. Different mobile terminals can be allocated to corresponding network layers according to traffic of the mobile terminals, thereby effectively suppressing interference and improving communication efficiency. In addition, different combinations of infrastructure and resources are used to provide network coverage for different mobile terminals, so that the utilization efficiency of the combinations of infrastructure and resource, user experience, and performance are improved, and the unbinding of services and resources is achieved.

An embodiment of the present disclosure further provides a computer-readable storage medium, storing computer-executable instructions which, when executed by a computer, cause the computer to implement the multi-layer network communication method in any one of the above embodiments.

The embodiments of the present disclosure include a multi-layer network communication system, a multi-layer network communication method, an operation control device, a communication device, and a computer-readable storage medium. According to the schemes provided in the embodiments of the present disclosure, a multi-layer network communication system is constructed based on an existing infrastructure and air interface protocol. Network layers of a multi-layer network constructed by the multi-layer network communication system includes an access layer and a service layer. The access layer includes at least one physical cell. The service layer includes at least one flexible cell. The flexible cell and the physical cell share an infrastructure and a spectrum, and use the same air interface protocol. The physical cell is configured for implementing mobility management of a mobile terminal in a non-access idle state. The multi-layer network includes a plurality of network layers for different functions and purposes. Different mobile terminals can be allocated to corresponding network layers according to traffic of the mobile terminals, thereby effectively suppressing interference and improving communication efficiency.

Those having ordinary skill in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium or non-transitory medium and a communication medium or transitory medium. As is known to those having ordinary skills in the art, the term "computer storage medium" includes volatile and nonvolatile, removable and non-removable media implemented in any method or technology for storage of information such as computer readable instructions, data structures, program modules, or other data. The computer storage medium includes, but not limited to, a Random Access Memory (RAM), a Read-Only Memory (ROM), an Electrically Erasable Programmable Read-Only Memory (EEPROM), a flash memory or other memory technology, a compact disc Read-Only Memory (CD-ROM), a Digital Versatile Disc (DVD) or other optical storage, a cassette, a magnetic tape, a magnetic disk storage or other magnetic storage device, or any other medium which can be used to store the desired information and can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

The embodiments of the present disclosure have been described in detail above with reference to the accompanying drawings, but the present disclosure is not limited to the above embodiments, and various changes may be made within the knowledge of those having ordinary skills in the art without departing from the protection scope of the present disclosure.

What is claimed is:

1. A multi-layer network communication system, wherein a multi-layer network constructed by the multi-layer network communication system comprises an access layer and a service layer, the access layer comprises at least one physical cell, the service layer comprises a flexible cell, and the flexible cell and the physical cell share an infrastructure and a spectrum, and use a same air interface protocol, the flexible cell is preset in the service layer, and a corresponding preset move-in condition is set for each type of flexible cell, the multi-layer network communication system comprising a physical cell processor, a flexible cell manager, and a flexible cell processor, wherein:

the physical cell processor is configured for processing data of the physical cell, implementing mobility management of a mobile terminal in a non-access idle state, receiving an access request from the mobile terminal, enabling the mobile terminal to access the multi-layer network, and sending information of the mobile terminal to the flexible cell manager;

the flexible cell manager is configured for creating the flexible cell processor according to the information of the mobile terminal, and allocating the mobile terminal to the flexible cell or the physical cell to receive a service, the flexible cell manager being further configured for, in response to the information of the mobile terminal satisfying the preset move-in condition, creating the flexible cell processor corresponding to the preset move-in condition, such that the flexible cell processor creates a corresponding flexible cell according to the information of the mobile terminal, and handing over the mobile terminal to the flexible cell to receive the service; and the flexible cell processor is configured for creating the flexible cell, processing data of the flexible cell, and performing data sending/receiving communication with the mobile terminal.

2. The multi-layer network communication system of claim 1, wherein the flexible cell is formed by a combination of the physical cell accessed by the mobile terminal and an antenna facility of a neighboring cell of the physical cell, and an antenna node of the antenna facility connected to the flexible cell is determined by the flexible cell processor.

3. The multi-layer network communication system of claim 2, wherein the flexible cell processor dynamically changes the antenna node connected to the flexible cell according to the information of the mobile terminal.

4. A multi-layer network communication method, performed by a flexible cell manager in a multi-layer network communication system, wherein a multi-layer network constructed by the multi-layer network communication system comprises an access layer and a service layer, the access layer comprises at least one physical cell, the service layer comprises a flexible cell, and the flexible cell and the physical cell share an infrastructure and a spectrum, and use a same air interface protocol; and the multi-layer network communication system further comprises a physical cell processor and a flexible cell processor, wherein the physical cell processor is configured for processing data of the physical cell, implementing mobility management of a mobile terminal in a non-access idle state, receiving an access request from the mobile terminal, enabling the mobile terminal to access the multi-layer network, and sending information of the mobile terminal to the flexible cell manager, the flexible cell manager is configured for creating the flexible cell processor, and the flexible cell processor is configured for creating the flexible cell, processing data of the flexible cell, and performing data sending/receiving communication with the mobile terminal, the method comprising:

receiving the information of the mobile terminal from a physical cell manager; and allocating, according to the information of the mobile terminal, the mobile terminal to the flexible cell or the physical cell to receive a service, wherein the flexible cell is preset in the service layer, and a corresponding preset move-in condition is set for each type of flexible cell; and in response to the information of the mobile terminal satisfying the preset move-in condition, creating a flexible cell processor corresponding to the preset move-in condition, such that the flexible cell processor creates a corresponding flexible cell according to the information of the mobile terminal, and the flexible cell manager hands over the mobile terminal to the flexible cell to receive the service.

5. The multi-layer network communication method of claim 4, wherein in response to the information of the mobile terminal satisfying none of the preset move-in conditions, camping the mobile terminal on the physical cell to receive the service.

6. The multi-layer network communication method of claim 4, wherein a corresponding preset move-out condition is set for each type of flexible cell, and when the mobile terminal receives the service in the flexible cell:

in response to one type of flexible cell being preset in the service layer and the information of the mobile terminal satisfying the preset move-out condition, handing over the mobile terminal to the physical cell to receive the service; or in response to a plurality of types of flexible cells being preset in the service layers and the information of the mobile terminal satisfying the preset move-out condition, determining whether the information of the mobile terminal satisfies any of the preset move-in conditions; and in response to the information of the mobile terminal satisfying one of the preset move-in conditions, creating a flexible cell processor corresponding to the preset move-in condition, such that the flexible cell processor creates the flexible cell and the flexible cell manager hands over the mobile terminal to the created flexible cell to receive the service; or in response to the information of the mobile terminal satisfying none of the preset move-in conditions, handing over the mobile terminal to the physical cell to receive the service.

7. The multi-layer network communication method of claim 5, wherein in response to the mobile terminal receiving the service in the physical cell and the information of the mobile terminal satisfying any of the preset move-in conditions, creating the corresponding flexible cell processor, such that the flexible cell processor creates the flexible cell and the flexible cell manager hands over the mobile terminal to the created flexible cell to receive the service.

8. The multi-layer network communication method of claim 4, wherein after the flexible cell is created, configuring the physical cell accessed by the mobile terminal and a neighboring cell of the physical cell as neighboring cells of the flexible cell.

9. The multi-layer network communication method of claim 6, wherein after moving the mobile terminal out of the flexible cell, deleting the flexible cell processor corresponding to the flexible cell.

10. An operation control apparatus, comprising at least one control processor and a memory communicatively connected to the at least one control processor, wherein the memory stores instructions executable by the at least one control processor which, when executed by the at least one control processor, cause the at least one control processor to carry out a multi-layer network communication method, performed by a flexible cell manager in a multi-layer network communication system, wherein a multi-layer network constructed by the multi-layer network communication system comprises an access layer and a service layer, the access layer comprises at least one physical cell, the service layer comprises a flexible cell, and the flexible cell and the physical cell share an infrastructure and a spectrum, and use a same air interface protocol; and the multi-layer network communication system further comprises a physical cell processor and a flexible cell processor, wherein the physical cell processor is configured for processing data of the physical cell, implementing mobility management of a mobile terminal in a non-access idle state, receiving an access request from the mobile terminal, enabling the mobile terminal to access the multi-layer network, and sending information of the mobile terminal to the flexible cell manager, the flexible cell manager is configured for creating the flexible cell processor, and the flexible cell processor is configured for creating the flexible cell, processing data of the flexible cell, and performing data sending/receiving communication with the mobile terminal, the method comprising:

receiving the information of the mobile terminal from a physical cell manager; and allocating, according to the information of the mobile terminal, the mobile terminal to the flexible cell or the physical cell to receive a service, wherein the flexible cell is preset in the service layer, and a corresponding preset move-in condition is set for each type of flexible cell; and in response to the information of the mobile terminal satisfying the preset move-in condition, creating a flexible cell processor corresponding to the preset move-in condition, such that the flexible cell processor creates a corresponding flexible cell according to the information of the mobile terminal, and the flexible cell manager hands over the mobile terminal to the flexible cell to receive the service.

11. A communication device, comprising the operation control apparatus of claim 10.

12. A non-transitory computer-readable storage medium, storing computer-executable instructions which, when executed by a computer, cause the computer to carry out the multi-layer network communication method of claim 4.

13. The multi-layer network communication method of claim 5, wherein after the flexible cell is created, configuring the physical cell accessed by the mobile terminal and a neighboring cell of the physical cell as neighboring cells of the flexible cell.

14. The multi-layer network communication method of claim 6, wherein after the flexible cell is created, configuring the physical cell accessed by the mobile terminal and a neighboring cell of the physical cell as neighboring cells of the flexible cell.

15. The multi-layer network communication method of claim 4, wherein camping the mobile terminal on the physical cell for location update, broadcast, and paging message receiving and sending.

16. The multi-layer network communication method of claim 4, further comprising:

determining, by the flexible cell processor, a coverage range of the flexible cell, and determining, by the flexible cell processor, an antenna node connected to the flexible cell according to the information of the mobile terminal.

17. The multi-layer network communication method of claim 4, further comprising:

dynamically changing, by the flexible cell processor, an antenna node connected to the flexible cell according to change of the information of the mobile terminal.

18. The multi-layer network communication method of claim 4, wherein for a plurality of mobile terminals, one service layer in the multi-layer network communication system comprises a plurality of flexible cells corresponding to the plurality of mobile terminals.

* * * * *